United States Patent
Klausing et al.

(10) Patent No.: US 6,603,423 B2
(45) Date of Patent: Aug. 5, 2003

(54) METHOD FOR DETECTING WIRES USING THE ROSAR SYSTEM

(75) Inventors: Helmut Klausing, Hochstadt (DE); Horst Kaltschmidt, Neubiberg (DE)

(73) Assignee: EADS Deutschland GmbH, Munich (DE)

(*) Notice: Subject to any disclaimer, the term of this patent is extended or adjusted under 35 U.S.C. 154(b) by 0 days.

(21) Appl. No.: 10/050,895

(22) Filed: Jan. 18, 2002

(65) Prior Publication Data

US 2002/0135506 A1 Sep. 26, 2002

(30) Foreign Application Priority Data

Jan. 18, 2001 (DE) .......................... 101 01 990

(51) Int. Cl.$^7$ .............................................. G01S 13/00
(52) U.S. Cl. ..................... 342/25; 342/29; 342/133; 342/145; 342/159; 342/189; 342/195; 342/196
(58) Field of Search ............... 342/20, 25, 29, 342/94, 59, 90, 133, 139, 145, 159, 165, 174, 158, 188, 189, 191–195; 343/705, 708, 725, 756, 767, 770, 793, 909; 340/945–946

(56) References Cited

U.S. PATENT DOCUMENTS 4,737,788 A * 4/1988 Kennedy ................. 342/159
5,379,041 A * 1/1995 Klausing ................. 342/145
5,465,142 A * 11/1995 Krumes et al.
5,777,573 A * 7/1998 Klausing et al. .............. 342/25
5,859,597 A * 1/1999 Cornelio et al.
6,278,409 B1 * 8/2001 Zuta ........................ 342/188

FOREIGN PATENT DOCUMENTS

DE 19521624 A1 * 12/1995
WO 99/46831 9/1999

OTHER PUBLICATIONS

G. Krieger et al., SIREV–Sector Imaging Radar for Enhanced Vision, pp. 377–382.*
M W Barclay et al., High Resolution SAR/ISAR Imaging From A Helicopter Platform, Radar systems Division, No. 449, IEE 1997, pp. 109–113.*
Helmut Klausing et al., Feasibility of A Synthetic Aperture Radar With Rotating Antennas (ROSAR), IEEE international radar conference, 1990, pp. 51–56.*
Search Report.

* cited by examiner

Primary Examiner—Thomas H. Tarcza
Assistant Examiner—Isam Alsomiri
(74) Attorney, Agent, or Firm—Crowell & Moring LLP

(57) ABSTRACT

A ROSAR wire detection method is based upon ROSAR focusing of entire segments of wire. By generating a wire reference signal comprised of a sum of coherent reference signals, the basis for reliable wire detectability is provided.

2 Claims, 4 Drawing Sheets

METHOD FOR DETECTING WIRES USING THE ROSAR SYSTEM

BACKGROUND AND SUMMARY OF THE INVENTION

This application claims the priority of German patent document 101 01 990.4, filed Jan. 18, 2001, the disclosure of which is expressly incorporated by reference herein.

The invention relates to a method for detecting wires using a synthetic aperture radar system based upon rotating antennas (ROSAR).

One of the greatest dangers in helicopter flight is that the pilot might overlook a wire obstacle located across his flight path, which could result in a serious accident or crash. This risk is increased under adverse weather conditions, such as rain, fog, snowfall, etc. The systems currently provided on board a helicopter are purely passive systems, such as residual light amplifiers, heat imaging systems, etc., which cannot be used under conditions of fog, smoke, and precipitation, due to their limited range. And recently implemented optical, electro-optical, and laser-based imaging systems also cannot significantly improve the situation in terms of detecting wire obstacles under adverse weather conditions, fog, or smoke.

German patent documents DE 39 22 086 and DE 43 23 511 disclose a ROSAR system that operates on-line in near real time, and can be used not only in mapping and mine detection applications, but also for detecting obstacles. The provided detection of wires via reflection points in various resolution cells, however, assumes a strong dominance of the reflection of the wire cross sections within a resolution cell. If this prerequisite is not met, costly postprocessing of the ROSAR images may improve the detectability of wires; however this method is not only costly—as mentioned above—it also cannot be considered sufficiently accurate.

One object of the present invention is to provide a method which guarantees optimized wire detectability based upon a ROSAR focusing system.

This and other objects and advantages are achieved by the detection method according to the invention, which is based on ROSAR focusing of entire segments of wire. By generating a wire reference signal comprised of a sum of coherent reference signals, reliable wire detectability is provided.

As shown in FIG. 5, ROSAR rings are generated by a rotating receiving antenna located on the tip of a rotor blade. The rotating receiving antenna itself describes a circle with a radius being the length of the rotor blade (not illustrated). The wire, which is disposed at a distance $R_0$ from the position of the helicopter, extends over several adjacent range rings. When a helicopter approaches a wire obstacle, the approach of the wire obstacle to that circle is necessarily always tangential, independent of the position of the helicopter and the position of wire obstacle. The continued approach is then always parallel to this. Thus, the number of possibilities for approaching is reduced. For further calculation it is assumed that the wire obstacle is a straight wire segment. This assumption is sufficiently accurate because a wire drawn between two sustainers is approximately straight. Consequently, for determining the wire reference signal a straight wire segment is assumed.

Other objects, advantages and novel features of the present invention will become apparent from the following detailed description of the invention when considered in conjunction with the accompanying drawings.

DETAILED DESCRIPTION OF THE INVENTION

ROSAR (Rotating Synthetic Aperture Radar)—in other words synthetic aperture radar based upon rotating antennas—the potential for detecting a wire obstacle under adverse weather conditions, as has already been demonstrated experimentally. The problem exists, however, that the wavelengths that are used must lie within the magnitude of the diameter of the wire obstacle to be detected; hence the radar reflection cross section is relatively small.

In the simulation of high-tension wires or lines, modeling of the wire obstacle is provided by a smooth rod, which, due to its reflective properties, offers reflection signals only in the case of a vertical incidence of the transmitting signal. In practice, however, high-tension lines that pose a danger to helicopters are comprised of individual coiled wires, creating reflection points that lie close to one another but have a small reflection cross section. The actual problem is that it is not always certain that the radar reflection cross section of the high-tension cable in a resolution cell will be greater than the reflection cross-section of a wire-free resolution cell.

In traditional SAR or ROSAR signal processing methods, the received signal mix is cross-correlated with a reference signal, which is the response of a punctiform reflector to irradiation with the transmitted signal from the moving transmitting and receiving antenna. This causes the received signal energy of a reflection point to be focused over the entire rotating angle of the rotor, but only that signal energy that originates from a single reflection point.

Figure 1:
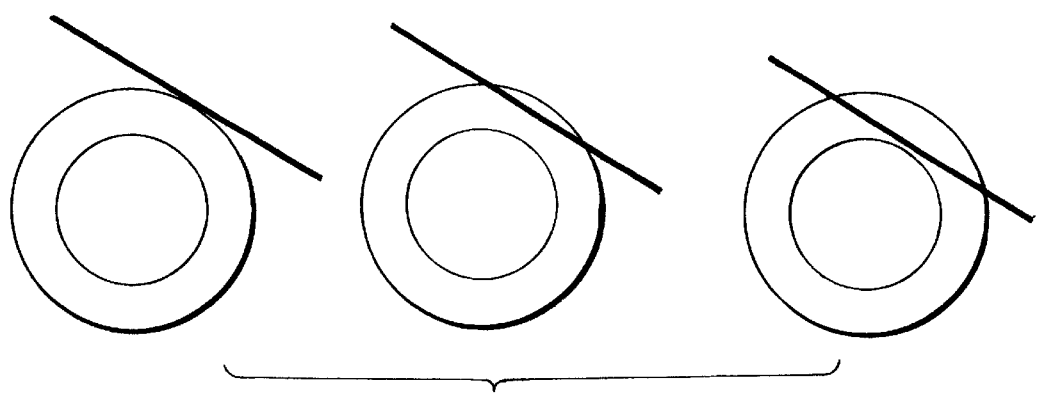
FIG. 1 is a schematic illustration of various positions for a segment of wire within a ROSAR range ring, as this ring is approached.
Figure 4:
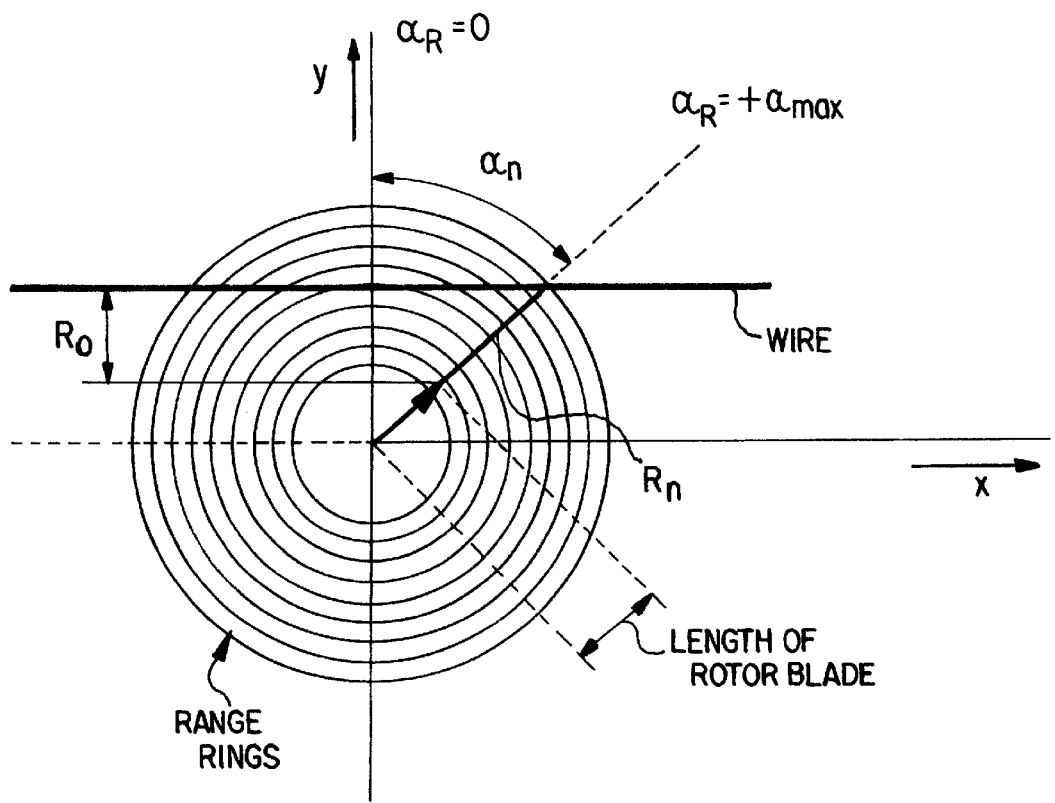
FIG. 4 shows ROSAR rings which are generated by the rotating receiving antenna located on the tip of a rotor blade.

According to the present invention, a special "wire reference signal" is generated, which is then used to focus all partial signals that originate from a section of wire. This wire reference signal is naturally dependent upon the position of the wire. Hence, a wide variety of wire reference signals is created, all of which must be correlated with the received signal, which would ordinarily require management of a dubiously large number of calculations. The variety of wire reference signals, however, can be limited substantially by means of a special technique which uses a straight wire that a helicopter is approaching and that enters a ROSAR range ring (FIGS. 1 and 4). As noted previously, the approach to a range ring in the ROSAR system is always tangential, due to the system's panoramic (360°) field of view. The continued approach is then parallel to this.

This is illustrated in FIG. 4, which shows the basic concept of the invention. As noted, when a helicopter approaches a wire obstacle a wire segment of the straight wire obstacle is tangential to the circle, which is described by the rotating rotor blade. For this wire segment, which extends over several adjacent range rings, a wire reference signal is determined, as the coherent sum of partial signals which are reflected along the segment of wire. For determining the wire reference signal only, the partial signals of the wire segment $-\alpha_{max} \leq \alpha_n \leq \alpha_{max}$ are taken into account. The wire reference signal is stored in a wire reference signal memory whereby the storage positions are addressed by the transit time $\tau_n$ and the distance $R_n$. (See FIG. 5.)

Figure 5:
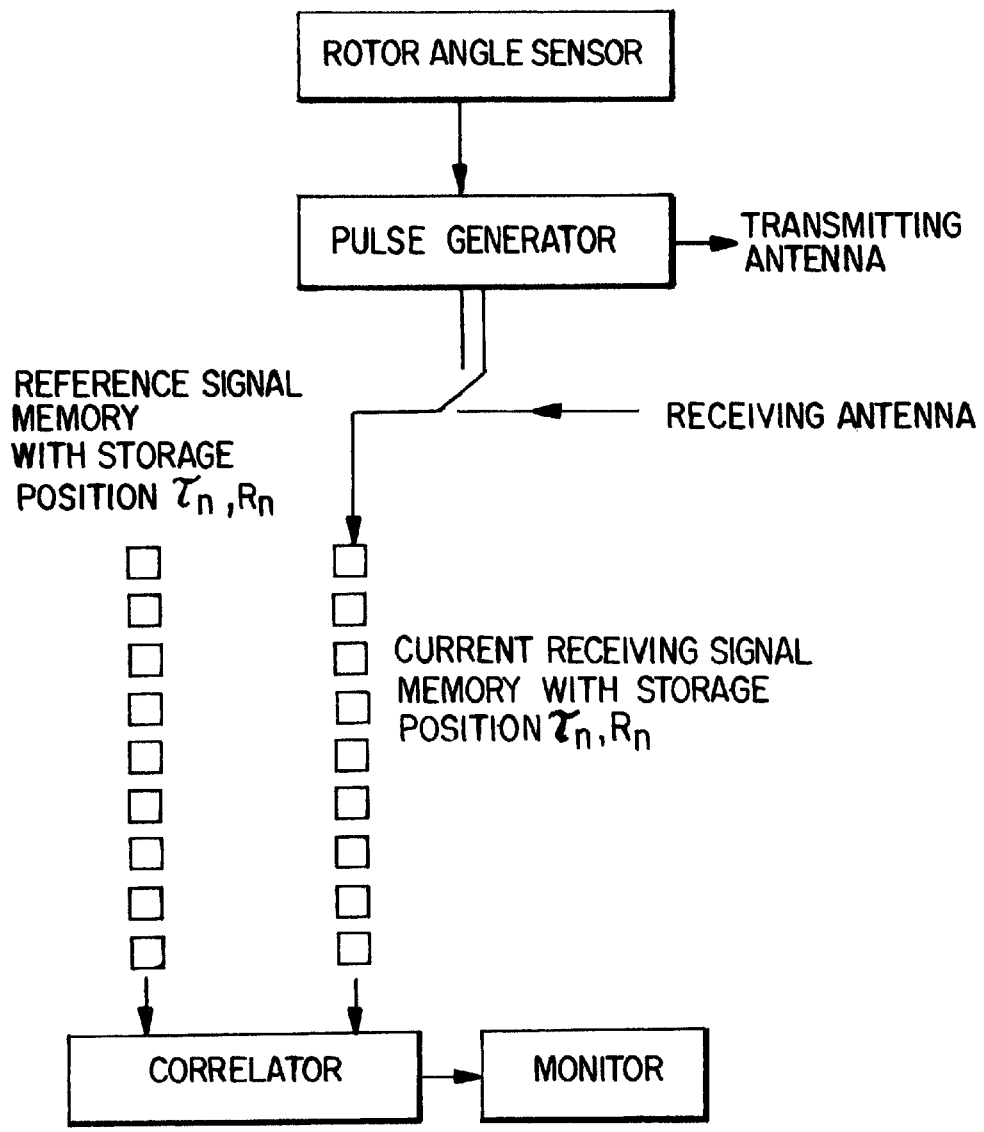
FIG. 5 shows the configuration of a ROSAR system for detecting wires according to the invention.

A correlator is used to correlate the wire reference signal from the wire reference signal memory with the current receiving signal from a receiving signal memory, as shown in FIG. 5. The correlation signal can be displayed, and can also be analyzed so that if it exceeds a given threshold the wire alarm is set off (FIG. 5.)

As is known from traditional ROSAR signal processing methods, at the angle position $\alpha_R$ the transmitting antenna transmits pulse signals, and the reflected signals of a certain transit time are stored in a respective range ring memory for that transit time. According to the invention the reflected partial signals which are characterized by the rotor position $\alpha_R$ and the transit time $$\tau_n = \frac{2R_0}{c \cdot \cos\alpha_n}$$

are stored in the current receiving signal memory. This is a fundamental difference between the invention and the traditional ROSAR signal processing methods.

Figure 2:
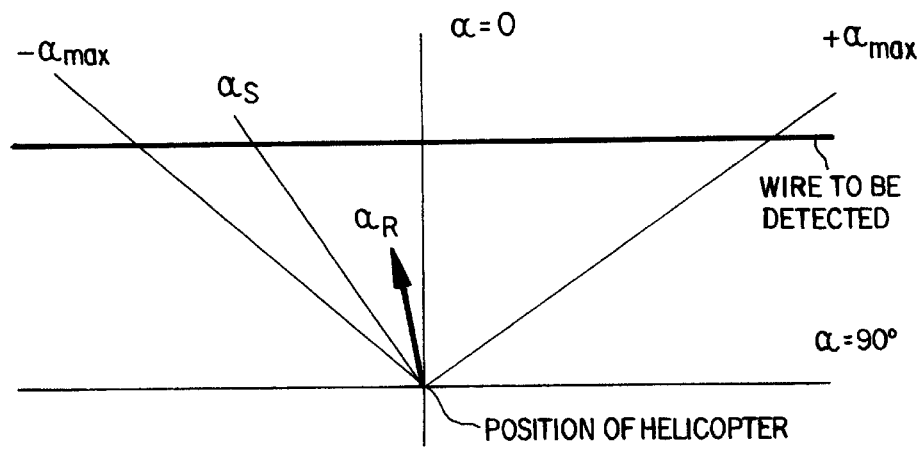
FIG. 2 is a schematic diagram which illustrates the wire detection process.

In contrast to known ROSAR processing systems, cross-correlation of the received signal according to the method of the invention is not performed using the point reference signal along the angle of rotation in a single range ring; rather the entire received signal from a sector in which the wire obstacle is supposedly located is correlated with the wire reference signal (FIG. 2).

In the case of a ROSAR embodiment comprising a transmitting antenna that is fixed on the fuselage and a receiving antenna that is mounted near the tips of the blades, the wire detection process according to the invention includes the following steps: In the rotor position $-\alpha_{R,max}$ a pulse is transmitted, and the backscattered received signals are stored in the memory position $-\alpha_{max}$ (FIG. 2). In the meantime, the rotor has turned farther to the angle $\alpha_R$, and the same process is repeated, until the rotor has reached $+\alpha_{max}$. This received signal which is dependent upon the angle of rotation $\alpha$ of the rotor blade (and hence, of the receiving antenna) is correlated with the wire reference signal, which is also dependent upon the angle of rotation.

It should be noted that the angle range between $-\alpha_{max}$ and $+\alpha_{max}$ is the full width of half maximum of the antenna receiving diagram. The angle range can vary between a small angle and 180 degrees and is defined by the design of the antenna aperture. $\alpha_S$ indicates the angle under which a partial signal of the backscattered (reflected) signal of the wire segment is received.

Figure 3:
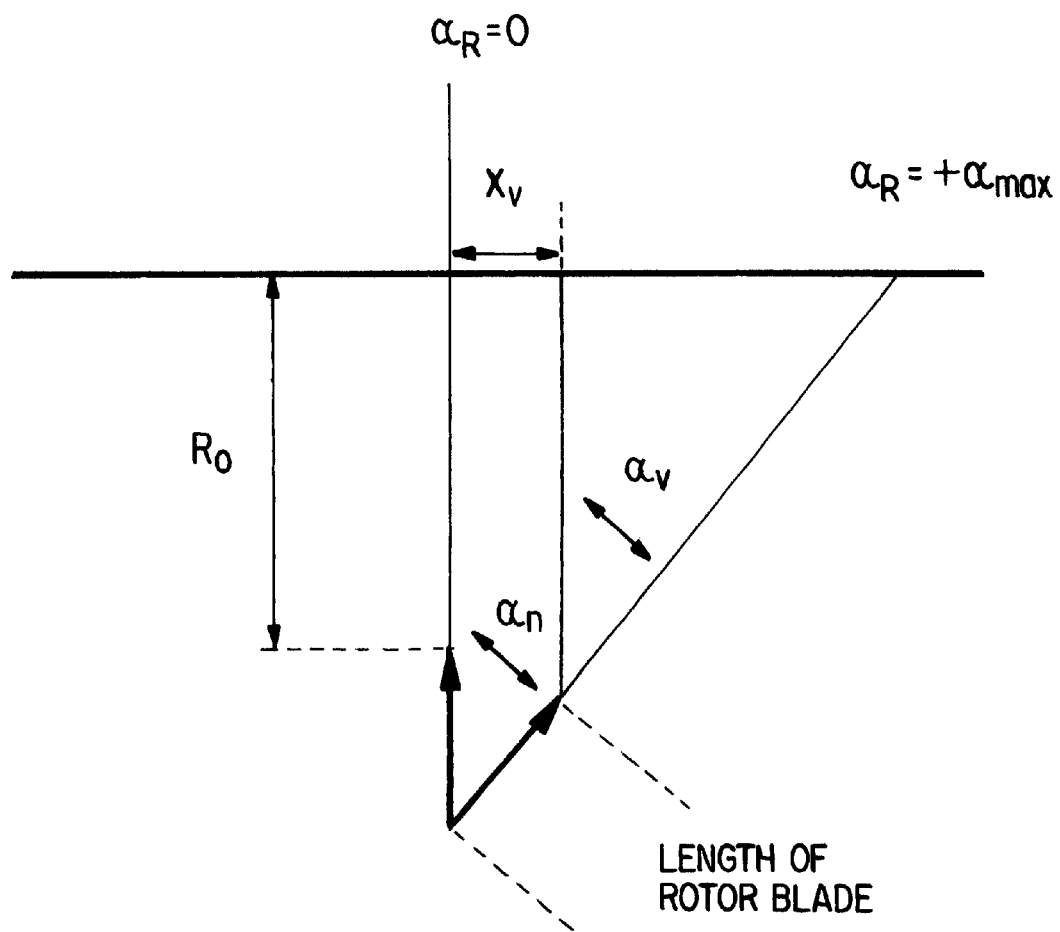
FIG. 3 is a schematic diagram of the calculation of the wire reference signal.

To generate the wire reference signal in accordance with the invention, the received signals for the individual reflection points of the wire are calculated, taking into account the different transit times, these reflection points lying along a single line, which is shifted geometrically. Afterward, the partial received signals are calculated based upon the rotating antennas, also taking into consideration the different transit times and doppler shifts, and are combined to form a single "wire reference signal", as is illustrated in FIG. 3. In the presence of irregular circular motions of the transmitting and receiving antennas, an optimization via application of the Rechenberg Optimization Method for ROSAR (DE 198 51 910 C1) may also be implemented.

Expediently, discrete reflection points, which are characterized by their distance from the vertical axis ($\alpha_R=0$ in FIG. 3), are assumed on the segment of wire to be detected. For this purpose, it is assumed, that the reflection of the wire is diffuse along its entire length. (The reflection points of the wire are not predetermined but are established just for modeling.) Because of the assumption that the reflection of the wire is diffuse, a partial reflection signal of the wire can be seen as having its origin at an adjacent point on the segment of wire. The total reflection signal of the segment of wire is thus comprised of the sum of all partial reflection signals of the wire.

The reference signal $S_{Ds}$ for the segment of wire is thus comprised of a sum of partial signals, as follows:

$$S_{Ds} = \sum_{\alpha_R=-\alpha_{R\max}}^{\alpha_R=\alpha_{R\max}} \sum_{v=1}^{n} S_v 2\pi \left( f_T + \frac{2V}{c} f_T \sin\alpha_v(X_v) \right) t$$

Herein, $f_T$ refers to the carrier frequency, in other words the transmitter frequency, V is the tangential speed of the rotor, and c is the speed of light.

The distance between adjacent reflection points is arbitrary, so long as the phase information of coherent waves is maintained. This requirement is fulfilled with a distance which is less than 1/16 of the transmitter wavelength. (The reflection points, it should be noted, are in fact a kind of abstract points, which are defined only for calculation of the wire reference signal.) Thus, referring to FIG. 3, for each rotor position $\alpha_R$ the sum of the receiving signals of all discrete reflection points of the segment of wire is performed. The reflection points are characterized by their distance $X_v$ from the vertical axis ($\alpha_R=0$). The parameter $v$ runs from 1 to an upper limit n, with the requirement that the distance between adjacent points is less than 1/16 of the transmitter wavelength. This calculation is performed for each rotor position $\alpha_R$ between $-\alpha_{max}$ and $\alpha_{max}$ to achieve the total reference signal for the wire segment.

A fundamental difference between a point reference signal and the wire reference signal described herein is that in the case of the point reference signal, for each angle of rotation $\alpha_R$ of the antenna position, only one received signal with only one discrete doppler shift occurs, while with the wire reference signal a sum of signals of different frequencies occurs.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a synthetic aperture radar system based upon rotating antennas (ROSAR) that operates at pulse frequency or in FM-CW operation to detect wire obstacles on the basis of a ROSAR focusing of entire segments of wire, said method comprising:

establishing a wire reference signal from the sum of reference signals whose reflection points lie along a single line, which is shifted geometrically, taking into consideration differing transit times and doppler shifts; and correlating an entire received signal from a sector in which a wire obstacle may be situated, with the wire reference signal.

2. The method in accordance with claim 1, wherein:

received signals that are dependent upon an angle of rotation $\alpha$ of a rotating antenna are correlated with the wire reference signals; and the wire reference signals are dependent upon the angle of rotation.

* * * * *